United States Patent
Nagy et al.

[11] Patent Number: 5,739,794
[45] Date of Patent: Apr. 14, 1998

[54] VEHICLE WINDOW ANTENNA WITH PARASITIC SLOT TRANSMISSION LINE

[75] Inventors: Louis Leonard Nagy; Douglas Courtney Martin, both of Warren, Mich.

[73] Assignees: General Motors Corporation, Detroit, Mich.; Delco Electronics Corporation, Kokomo, Ind.

[21] Appl. No.: 634,649

[22] Filed: Apr. 18, 1996

Related U.S. Application Data

[63] Continuation-in-part of Ser. No. 445,884, May 22, 1995, Pat. No. 5,528,314.

[51] Int. Cl.$^6$ ................................................ H01Q 1/32
[52] U.S. Cl. ................................................ 343/713; 343/711
[58] Field of Search ................................ 343/704, 713, 343/846, 848, 711, 712, 767, 769; H01Q 1/32

[56] References Cited

U.S. PATENT DOCUMENTS

| | | | |
|---|---|---|---|
| 3,766,563 | 10/1973 | Sauer et al. | 343/713 |
| 4,063,247 | 12/1977 | Sakurai et al. | 343/713 |
| 4,163,195 | 7/1979 | Sauer | 325/313 |
| 4,608,570 | 8/1986 | Inaba et al. | 343/713 |
| 4,768,037 | 8/1988 | Inaba et al. | 343/713 |
| 4,849,766 | 7/1989 | Inaba et al. | 343/713 |
| 4,864,316 | 9/1989 | Kaoru et al. | 343/704 |
| 5,005,020 | 4/1991 | Ogawa et al. | 343/713 |
| 5,012,255 | 4/1991 | Becker | 343/704 |
| 5,017,933 | 5/1991 | Sakurai et al. | 343/704 |
| 5,083,135 | 1/1992 | Nagy et al. | 343/713 |
| 5,461,391 | 10/1995 | Ohnishi et al. | 343/713 |
| 5,528,314 | 6/1996 | Nagy et al. | 343/713 |
| 5,581,263 | 12/1996 | Maeda et al. | 343/713 |

FOREIGN PATENT DOCUMENTS

| | | | |
|---|---|---|---|
| 0355424 | 2/1990 | European Pat. Off. | 343/713 |
| 0013404 | 1/1984 | Japan | 343/713 |

*Primary Examiner*—Donald T. Hajec
*Assistant Examiner*—Tan Ho
*Attorney, Agent, or Firm*—Robert M. Sigler

[57] ABSTRACT

A vehicle window antenna for receiving radio waves of a predetermined wavelength comprises an electrically conducting entity affixed to the window glass having a horizontally elongate principal element having an effective horizontal length of an odd multiple of one quarter of the predetermined wavelength and an impedance matching element having a length of a multiple of one half the predetermined wavelength, extending along but spaced from the edge of the window so as to form a slot transmission line therewith, and parasitically coupled to the principal element by a connecting element. The impedance matching element is an extended ribbon which may leave most of the viewing area of the window free. Therefore, it uses significantly less of the material from which the antenna itself is made; it may be made of non-transparent as well as transparent material; and it provides great flexibility of design, with a number of different embodiments and variations.

11 Claims, 3 Drawing Sheets

5,739,794

VEHICLE WINDOW ANTENNA WITH PARASITIC SLOT TRANSMISSION LINE

BACKGROUND OF THE INVENTION

This application is a continuation-in-part of U.S. Ser. No. 08/445,884, filed May 22, 1995 now U.S. Pat. No. 5,528,314 and entitled Transparent Vehicle Window Antenna. The technical field of the invention is vehicle window antennas.

U.S. Pat. No. 5,083,135, issued Jan. 21, 1992, describes a transparent film antenna for a vehicle window in the shape of a "T", with a horizontally elongate principal element spaced from and parallel to the upper horizontal edge of the window and a vertically elongate impedance matching element extending down the window from the center of the principal element. The film comprises a visually transparent, electrically conducting material and is disposed between the sheets of glass in a composite glass windshield. The antenna as described in the patent provides satisfactory performance in the commercial AM and FM broadcasting bands and can be adapted for television and/or telephone bands.

The antenna of the above identified U.S. Pat. No. 5,083,135 performs well, but its presence in the windshield of a vehicle affects the vehicle's appearance and therefore its commercial acceptance. Although the antenna film is generally transparent to visible light, it can appear to an observer to be different in color from the rest of the windshield, due to light diffraction effects. The horizontal principal element is placed in an upper, dark tinted region of a vehicle window to reduce its visibility; but the vertical impedance matching element projects downward into the center of the lighter tinted or non-tinted region of the window; and some may consider the color difference in this part of the windshield to be visually objectionable.

The antenna disclosed in patent application U.S. Ser. No. 08/445,884 modifies the impedance matching element from that shown in U.S. Pat. No. 5,083,135 to a transparent film comprising an enlarged main portion and a vertical connecting portion connecting the main portion to the principal element. The main portion covers most of the viewing area of the window but has a peripheral edge with a portion spaced from the edge of the window around the sides and bottom thereof to form a slot transmission line having an effective length which is a multiple of one half the wavelength to which the principal element is tuned. The slot transmission line is parasitically coupled to the principal element and performs the impedance matching for the antenna.

This impedance matching element provides a uniform, and therefore less objectionable, appearance over most of the main viewing area of the window, with the parasitically coupled slot transmission line formed between the impedance matching element and the edge of the window permitting adjustment of the antenna impedance by choice of the slot width, and further provides superior AM performance. In addition, such an antenna is compatible with a window incorporating an infrared blocking film or coating which is electrically conductive, since the same film can be used for both purposes without reducing antenna performance.

However, the antenna disclosed in U.S. Ser. No. 08/445,884 may not be optimal for all vehicles. For example, a film having particularly desirable infrared blocking or other qualities might not be electrically conductive; and to add a material to the film for electrical conductivity over the entire main viewing area of the window might not be economically justified. As another example, it may be desirable to use a non-transparent material for the antenna, with the antenna thus covering as little of the window as possible. For such cases, the advantages of forming a vehicle window antenna having a resonant principal element connected to an impedance matching element forming a slot transmission line with the vehicle body may be obtained without covering most of the viewing area of the window.

SUMMARY OF THE INVENTION

The invention is a vehicle window antenna for receiving radio waves of a predetermined wavelength comprising an electrically conducting entity affixed to the window glass having a horizontally elongate principal element having an effective horizontal length of an odd multiple of one quarter of the predetermined wavelength and an impedance matching element having a length of a multiple of one half the predetermined wavelength, extending along but spaced from the edge of the window so as to form a slot transmission line therewith, and parasitically coupled to the principal element by a connecting element. The impedance matching element, rather than covering most of the viewing area of the window, is an extended ribbon which may leave most of the viewing area of the window free. Therefore, it uses significantly less of the material from which the antenna itself is made; it may be made of non-transparent as well as transparent material; and it provides great flexibility of design, with a number of different embodiments and variations thereof.

DESCRIPTION OF A PREFERRED EMBODIMENT

Figure 1:
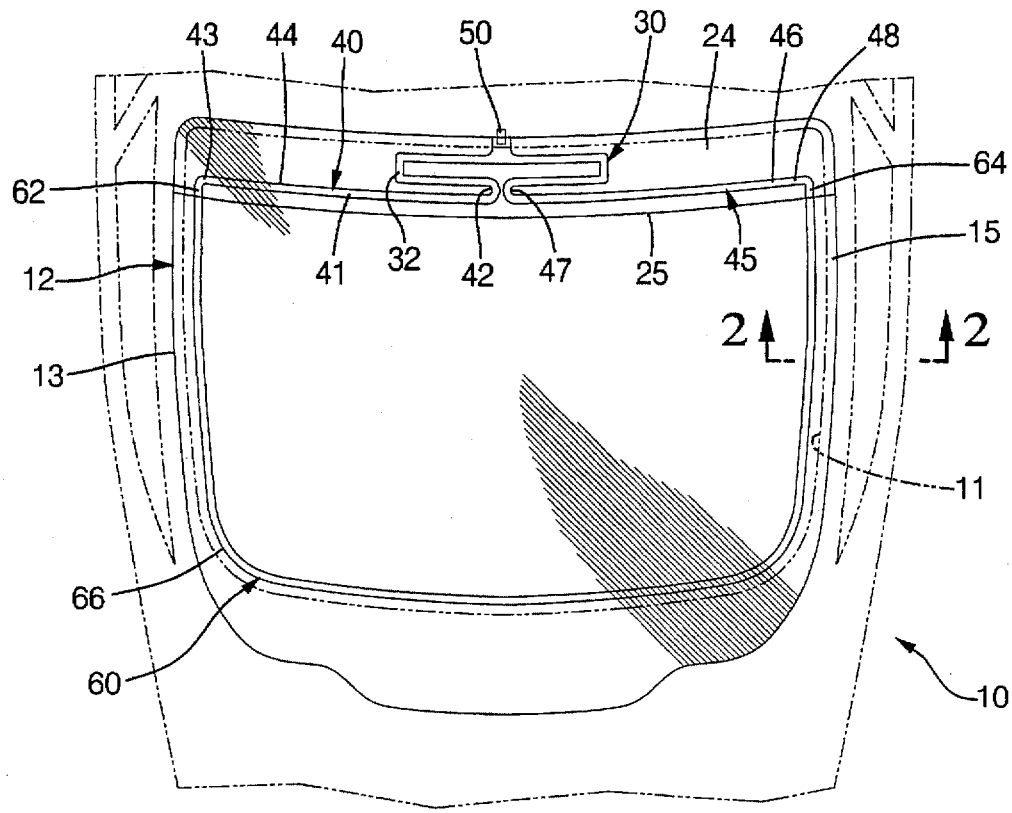
FIG. 1 shows a vehicle having a window provided with an antenna according to the invention.
Figure 2:
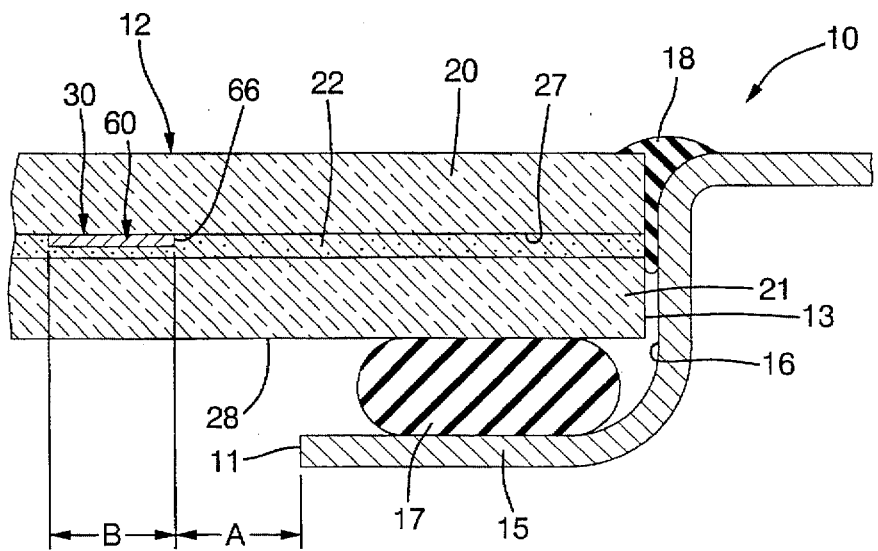
FIG. 2 shows a section view along lines 2—2 in FIG. 1.

FIGS. 1 and 2 show a portion of a vehicle body 10 made of an electrically conducting metal such as steel or aluminum and having a window defined by body window edge 11. A window glass 12 overlaps body window edge 11 around its periphery to provide, in this embodiment, a windshield for vehicle body 10. The outer edge 13 of windshield 12 overlaps a depressed annular flange region 15 of body 10 defined between body window edge 11 and a retaining wall 16 which connects flange region 15 to the remainder of body 10 and retains windshield 12 flush with the remainder of body 10 in a predetermined position relative to body window edge 11. As seen in FIG. 2, an annular sealing member 17 is placed between window glass 12 and depressed annular flange region 15 of body 10; and an annular molding 18 bridges the outer gap between vehicle body 10 and window glass 12; these elements are of standard material and construction and are omitted from FIG. 1 to avoid unnecessary clutter.

As seen in FIG. 2, windshield 12 is a standard laminated vehicle windshield formed of outer layer 20, preferably of glass, and inner layer 21, preferably of glass, with an interposed layer 22, preferably of a standard polyvinyl butyryl or similar thermoplastic material. Windshield 12 may be provided with a horizontal dark tinted region 24 across the top thereof, defined by its lower border 25 in FIG. 1; and this dark tinted region, commonly used in windshields for light and glare reduction, may be advantageously utilized in this invention to render the upper elements of a window antenna less visible.

An antenna 30 is provided as an electrically conducting entity affixed to windshield 12. For example, antenna 30 may comprise a film applied to the inner surface 27 of the outer layer 20 of windshield 12 so as to be contained between layers 20 and 21 of windshield 12, as shown in exaggerated thickness in FIG. 2. The film of antenna 30 may be made of a material such as, for example, tin oxide, which is essentially transparent to visible light and electrically conducting, preferably with a sheet resistance of 4 ohms per square or less. Alternatively, the antenna may be made of a non-transparent film or a frit material of silver and glass such as that commonly used in rear window defoggers; and the latter type of material is most commonly affixed to the outer surface 28 of inner layer 21. As will be apparent from the following description, most if not all of antenna 30 is preferably in the form of an extended band or ribbon having a width "B" as shown in FIG. 2, this width being constrained by a number of factors, including the sheet resistance and visual transparency of the antenna film material and the size and shape of the window in relationship to governmental standards and vehicle design. The basic requirement is to provide sufficient conductivity for the electric currents that run along the strip; and, for a given sheet resistance, this conductivity will vary directly with the width of the strip. Visually transparent materials generally have larger sheet resistances and must therefore be made wider, but their transparency allows the wider elements to be placed on a window without compromising window viewing area constraints. The materials with lower sheet resistance, such as the frit material mentioned above, are generally non-transparent to visible light; and window antenna elements made therefrom must therefore be made narrower so as not to affect visibility through the window.

Antenna 30 is a planar antenna; and its reception or radiating characteristics are greatly affected by its planar shape. The antenna may be described as comprising three basic elements. The first of these is a principal element similar in outer shape, dimensions and orientation to the principal element of the referenced U.S. Pat. No. 5,083,135 and the parent U.S. patent application Ser. No. 08/445,884: a horizontally elongate principal element 32 substantially parallel to and spaced from the upper horizontal portion of body window edge 11. Principal element 32 is essentially rectangular, although its horizontal edges may follow any slight curvature of the upper horizontal portion of body window edge 11 and its corners may be rounded for a more pleasing appearance. However, since most of the electrical currents flowing in principal element 32 exist near the outer edges, it is not necessary for principal element 32 to be continuous over the entire area within its outer dimensions. In FIG. 1, principal element 32 is shown as comprising essentially a strip or ribbon 10–25 mm in width and forming a hollow rectangle. Principal element 32 is a tuned element having an effective horizontal length of an odd integer multiple of one quarter (¼) of the wavelength to which it is tuned, whereby it exhibits a zero reactive impedance at the tuned wavelength. In this embodiment, which is designed for commercial radio reception in the U.S.A., principal element 32 is tuned to a wavelength in the center of the commercial FM broadcasting band, such as three meters, and thus has an effective horizontal length of about 0.75 meters. As with the antenna of U.S. Pat. No. 5,083,135, however, it has been found that the physical length of principal element 32 at resonance is somewhat shorter than a measured one quarter of the actual mid-band signal wavelength. It is believed that this is due to coupling with the vehicle body; and the length by which it is shorter will vary with the specific vehicle application. In one such vehicle, principal element 32 has been found to work well with an actual horizontal length of 60 cm and a vertical width of 50 mm. It is ideally spaced below the upper horizontal portion of body window edge 11 by a distance which provides maximum FM gain; but this distance may be compromised to gain other advantages, as described below, for a particular vehicle design.

The second element of antenna 30 is a connecting element 40, preferably comprising an elongated strip or ribbon having a horizontal connecting portion 41 connected to the lower edge of principal element 32 just to the left of the center of windshield 12 by a vertical connecting portion 42 and extending therefrom to an end 43 near one side of windshield 12, just short of body window edge 11. Horizontal connecting portion 41 has an upper edge 44 spaced at least 25 mm below the lower edge of principal element 32 so as to minimize transmission coupling effects therebetween so that no slot transmission line is formed by connecting element 40. To simplify manufacture, connecting element 40 is preferably made of the same material in the same process as principal element 32. In the case of a visually transparent material such as tin oxide, it may have a substantially constant width "B" (in FIG. 2) of 10–25 mm; but, as described above, the width may be substantially less for some other materials, especially the frit material, which has substantially more electric conductivity for a given width.

The third element of antenna 30 is an impedance matching element 60, preferably comprising a strip or ribbon extension of connecting element 40 and made from the same material in the same process. Impedance matching element 60 has a first end 62 connected to end 43 of connecting element 40 and extends along body window edge 11 to a second end 64. In this embodiment, impedance matching element 60 extends downward along the left side of windshield 12, across the bottom thereof, and up the right side to end 64 at the same height as end 62. In this embodiment, a second connecting element 45 is provided as a mirror image of connecting element 40 on the right side of windshield 12. Connecting element 45 comprises a vertical connecting portion 47 extending downward from principal element 32 just to the right of vertical connecting portion 42 and a horizontal connecting portion 46 extending across windshield 12 to the right toward an end 48 just short of body window edge 11. End 64 of impedance matching element 60 is joined to end 48 of connecting element 45 so that antenna 30 provides a more visually appealing, symmetrical pattern on windshield 12.

Impedance matching element 60 has an outer edge 66 which is spaced a distance "A", as seen in FIG. 2, from body window edge 11 so as to provide, in combination therewith, a planar slot transmission line which is parasitically coupled to principal element 32 through connecting element 40. To this end, gap width "A" is preferably within the range 10–25 mm, with the precise gap width chosen to produce an antenna impedance to optimally match the characteristic impedance, typically 125 ohms, of a coaxial cable used to feed the antenna. In general, an impedance matching element such as element 60 forming a slot transmission line with the vehicle body in the antenna of this invention must have a length of substantially an integer multiple of one half the wavelength to which principal element 32 is tuned. In this embodiment, impedance matching element 60 is substantially the full wavelength to which principal element 32 is tuned. Since an electrical open circuit exists for the slot transmission line where the slot ends at each end 62, 64 of impedance matching element 60, the slot transmission line will have the effective length of impedance matching element 60; and this results in a resonance of the slot transmission line at the equivalent 3 meter wavelength, which corresponds to the center of the commercial FM broadcast band.

Antenna 30 is preferably fed at the upper center of principal element 32 or from an extension upward therefrom by feed apparatus 50, which encompasses any of the feed arrangements described in the aforementioned U.S. Ser. No. 08/445,884 or the patent application U.S. Ser. No. 08/610, 656, filed on Mar. 4, 1996 and entitled Vehicle Window with Antenna Connection Apparatus, both of which are incorporated by reference with regard to such feed arrangements.

For the sake of vehicle appearance, connecting elements 40 and 45 are preferably completely within dark tinted region 24 of windshield 12. However, this is a factor which may produce a compromise in the vertical position of principal element 32 as described above, due to design or governmental limits in the vertical extent of dark tinted region 24 below window edge 11. Generally, maximum antenna performance at a wavelength of three meters (FM) will be produced with a certain minimum distance of principal element 32 below window edge 11; but governmental standards set a maximum distance below window edge 11 for lower border 25 of dark tinted region 24. On some vehicle windshields, it may be impossible to place connecting elements 40, 45 below principal element 32 within dark tinted region 24 while maintaining the optimal minimum distance between connecting elements 40, 45 and principal element 32 and also maintaining the optimal minimum distance between principal element 32 and window edge 11; and on these windshields the latter may have to be compromised, with a resulting reduction in FM gain.

In addition, as is commonly provided on vehicle windshields for appearance, a dark, opaque, painted band, not shown in FIG. 2, may be provided around the sides and bottom of windshield 12; and this may substantially or completely cover the area outward from the outer edge 66 of impedance matching element 60 to the outer edge 13 of windshield 12 or perhaps even cover impedance matching element 60. This band can be broken into dots of decreasing size toward its inner boundary for a fade-out effect as is known in the industry.

As described above, antenna 30 of FIG. 1 uses two connecting elements 40 and 45, with impedance matching element 60 extending between them around the bottom of windshield 12. This may not be possible on windows of all sizes, due to constraints on the length and placement of impedance matching element 60; however, variations on the antenna of FIG. 1 can extend the range of windshield sizes. For a smaller windshield, for example, impedance matching element 60 will be too long to be connected precisely as shown. In that case, for a limited range of smaller windshield sizes, the horizontal connecting portions 41 and 46 of connecting elements 40 and 45, respectively, might extend toward the sides past the right and left ends, respectively, of principal element 32, where connecting elements 40 and 45 would then turn upward to connect with the ends of impedance matching element 60 at points higher up the sides or even partly across the top of body window edge 11.

At the longer wavelengths of commercial AM broadcast (e.g. 300 meters), antenna 30 is not a resonant antenna but is substantially a capacitive antenna; and its AM gain is expected to be comparable to whip and other vehicle antennas of the prior art.

Figure 3:
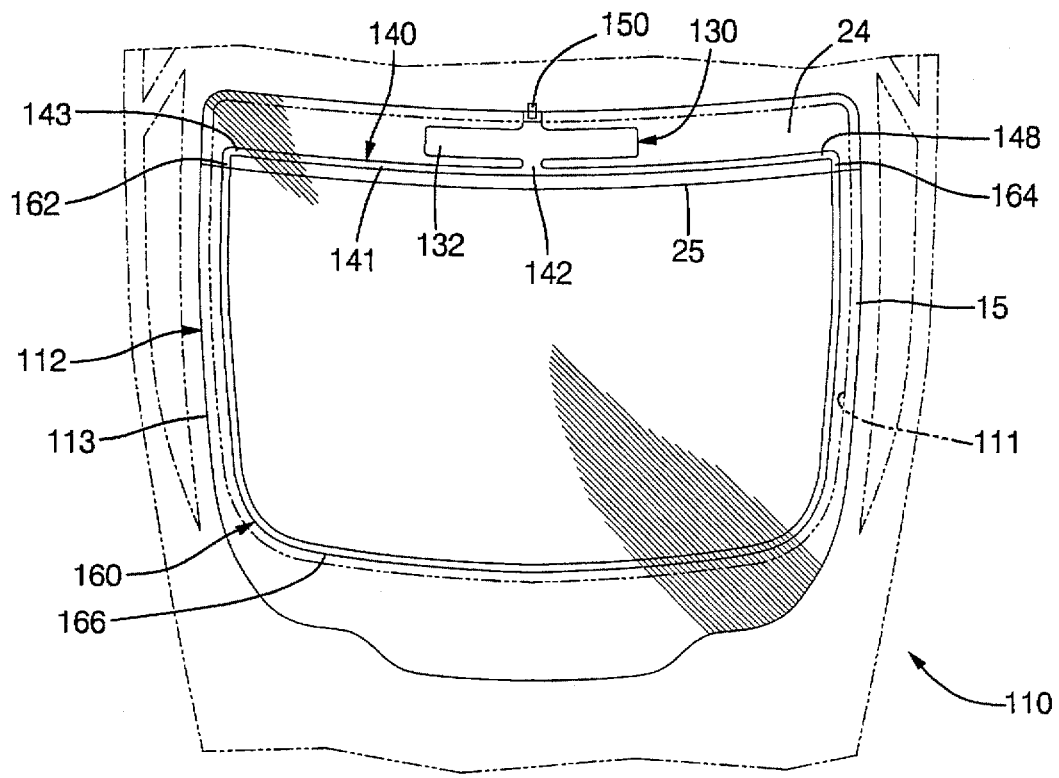
FIGS. 3–6 show vehicles having variations of the antenna of FIG. 1.

FIG. 3 shows a vehicle body 110 having an antenna 130 according to this invention which is a variation of antenna 30 in FIGS. 1 and 2. In antenna 130, principal element 132 is formed of a transparent, electrically conducting film which is continuous within its outer dimensions, as in the prior art antennas referred to above. In addition, connecting element 140 comprises a single horizontal connecting portion 141 which extends across windshield 112 with end 143 joining end 162 of impedance matching element 160 on the left, end 148 joining end 164 of impedance matching element 160 on the right, and preferably a single vertical connecting portion 142 joining horizontal connecting portion 141 to principal element 132 at the lower center thereof, although multiple vertical connecting portions may be used. Otherwise antenna 130 is identical to antenna 30, with corresponding elements having reference numerals which are similar but in the range 100–199.

Figure 4:
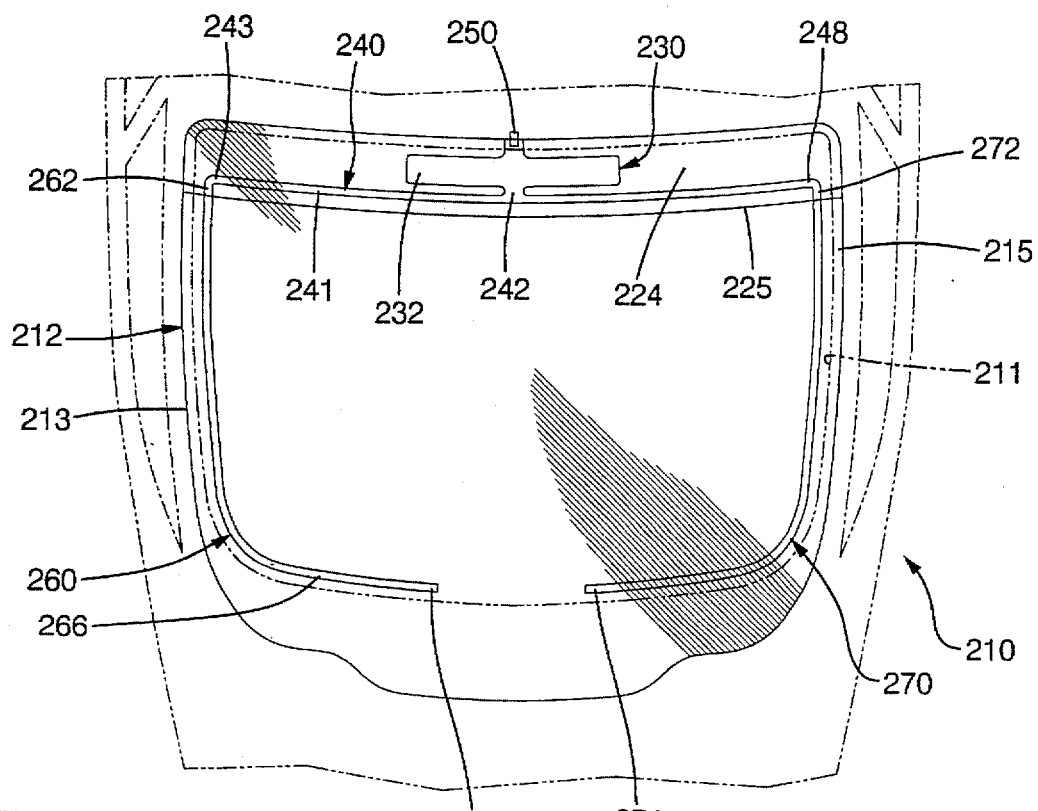

The embodiment of FIG. 4 provides another antenna 230 according to this invention for a larger windshield 212, the antenna being similar to that of FIG. 3, with corresponding elements similarly numbered in the range 200–299, except that impedance matching element 260 extends from an end 262, joined to the end 243 of a connecting element 240, to an end 264 at the bottom of windshield 212. End 264 is not connected to anything in this embodiment and thus appears as an open circuit to the slot transmission line formed between impedance matching element 260 and the vehicle body. The effective length of impedance matching element 260 is approximately 1.5 meters, which is one-half the 3 meter wavelength at the middle of the commercial FM broadcast band; and impedance matching element 260 will thus not reach the center of the bottom of the larger windshield 212. For symmetry, an optional similar impedance matching element 270 may extend as shown from an end 272, joined to the other end 248 of connecting element 240 near body window edge 211 at the right side of windshield 212, for the same length of approximately 1.5 meters to an end 274 at the bottom of windshield 212. Each of impedance matching elements 260 and 270 forms a slot transmission line with body window edge 211 which is coupled to principal element 232 through its connecting element 240 and which has an effective length of one-half the wavelength in the middle of the commercial FM broadcast band, at which wavelength antenna 230 will be resonant.

The embodiment of FIG. 4 could also be adapted to a wide range of smaller windshields by eliminating impedance matching element 270. On the smaller windshield, impedance matching element 260, with an effective length of 1.5 meters, would extend past the bottom center of the windshield, with end 264 to the right of center. The portion of connecting element 240 to the right of vertical connecting portion 242 would preferably be retained to enable optimization of electrical current patterns around the right side of principal element 232. In this case, it would not be functioning as a connecting element but rather as an additional impedance matching element for use in combination with the slot transmission line formed on the other side of windshield 212. The appearance of this embodiment would lack visual symmetry in the lower part of the windshield.

For a limited range of smaller or larger windshield sizes, the embodiment of FIG. 4 could be modified to use a single impedance matching element 260 as described in the previous paragraph but with a length of a full 3 meters. In this case, impedance matching element 260 would extend around the bottom of windshield 212 and up the right side thereof. On a windshield 212 larger than windshield 112 of FIG. 3, end 264 on the right side of impedance matching element 260 would not reach the stone height as end 262 joined to connecting element 240 on the left. On a windshield 212 smaller than windshield 112 of FIG. 3, end 264 of impedance matching element 260 would exceed the height of end 262. In this case, connecting element 240 could be redirected upward to connect with end 272 as previously described with reference to antenna 30 of FIG. 1 or could come straight across the windshield to stop just short of, and remain unconnected with, the lengthened impedance matching element 260. In either case, impedance matching element 260 would form a slot transmission line with body window edge 211 coupled to principal element 232 through connecting element 240 with a length of one full wavelength in the middle of the commercial FM broadcast band. The resulting antenna would lack visual symmetry, although this might be less noticeable for the case of a smaller windshield for which end 264 of impedance matching element 260 is within dark tinted region 224.

Figure 5:
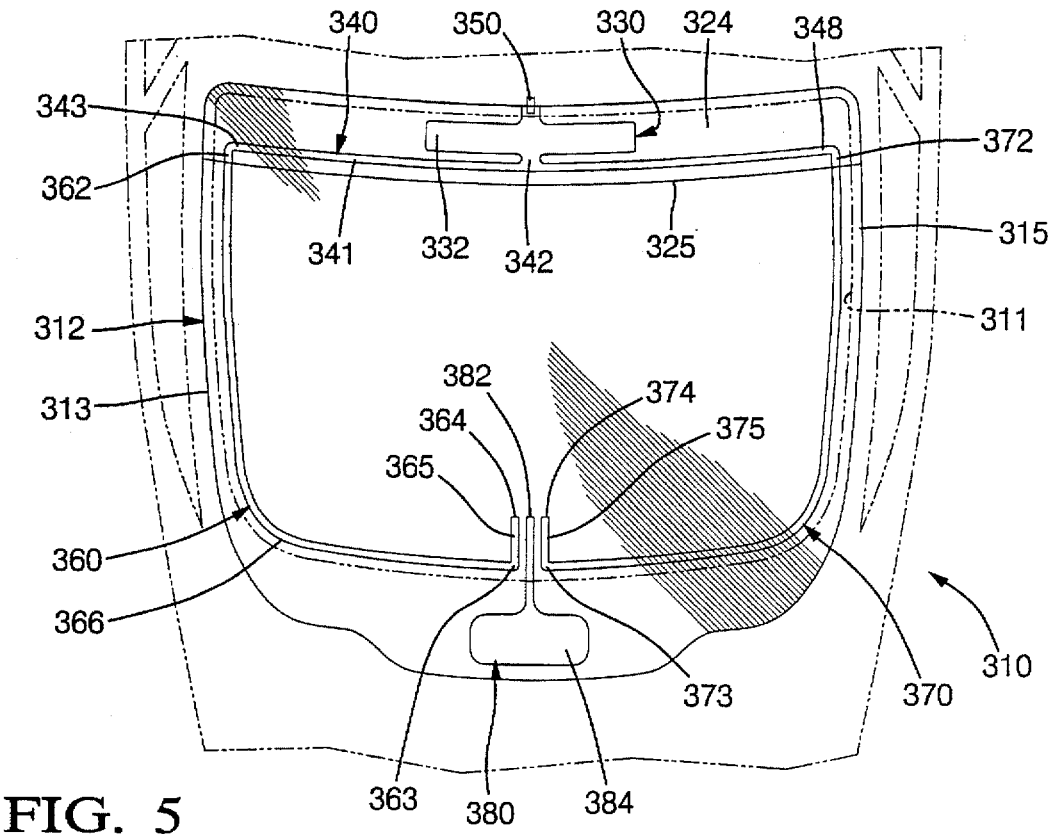

FIG. 5 shows a visually symmetric embodiment of the invention for a smaller windshield 312, antenna 330 being similar to antenna 230 of FIG. 4, with corresponding elements similarly numbered in the range 300–399. However, in antenna 330, impedance matching element 360 extends from the end 343 of connecting element 340 downward to the bottom of windshield 312, across to a point 363 close to the center thereof, and upward again in a vertical end portion 365 to an end 364. In addition, the ground plane of body 310 is extended upward by a ground stub 380, which has a ground extension portion 382 extending perpendicularly upward from body window edge 311 at the bottom thereof, parallel with vertical end portion 365, and a ground coupling portion 384 extending downward from body window edge 311 for electrically coupling with the ground plane of vehicle body 310. Ground stub 380 may be made from the same material and in the same process as antenna 330, although it is not connected therewith; and ground coupling portion 384 may be enlarged as shown in FIG. 5 for capacitive coupling with vehicle body 310 or may be physically connected with vehicle body 310 by a ground strap or other means. Ground stub 380 extends body window edge 311, for electrical antenna purposes, partly up and back down windshield 312 at its bottom center and thus extends the length of body window edge 311 to accommodate an impedance matching element that is longer in proportion to window size. The spacing between vertical end portion 365 and ground extension portion 382 is similar to that between the rest of impedance matching element 360 and body edge 311, so that vertical end portion 365 and ground extension portion 382 extend the slot to end 364. The length of impedance matching element 360, including vertical end portion 365, is approximately 1.5 meters, which is one-half the 3 meter wavelength at the middle of the commercial FM broadcast band.

For symmetry, an optional second impedance matching element 370 may extend as shown from the other end 348 of connecting element 340 downward to the bottom of windshield 312, across to a point 373 close to the center thereof, and upward from there in a vertical end portion 375 to an end 374 for a total length of approximately 1.5 meters. Vertical end portion 375, on the opposite side of ground extension portion 382 from vertical end portion 365, is similarly spaced therefrom to extend the slot formed by impedance matching element 370 to its full length. Each of impedance matching elements 360 and 370 forms a slot transmission line with body window edge 311 which is coupled to principal element 332 through connecting element 340 and which has a length of one-half wavelength in the middle of the commercial FM broadcast band.

Figure 6:
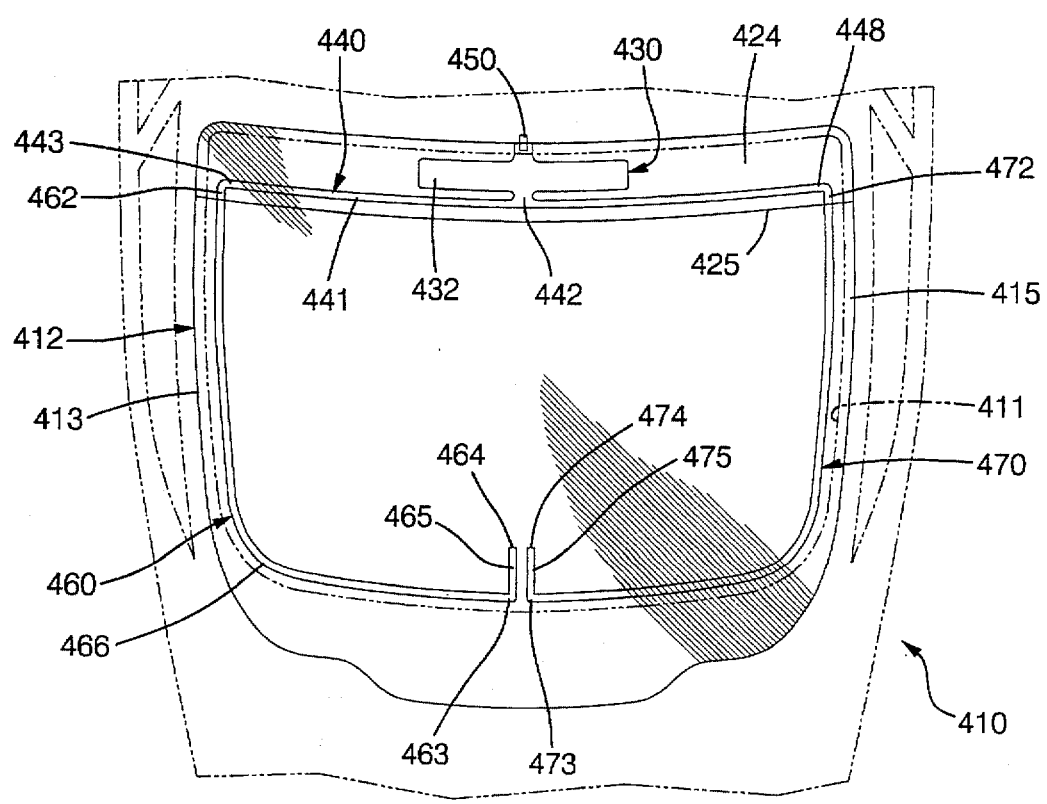

FIG. 6 shows another symmetric variation of the antenna of this invention which is similar to that of FIG. 5, with corresponding elements similarly numbered in the range 400–499. In the antenna 430 of FIG. 5, however, the ground stub has been eliminated. Instead, vertical end portion 465 of impedance matching element 460 and vertical end portion 475 of impedance matching element 470 are spaced apart by the same distance as the slots between the rest of impedance matching elements 460, 470 and body window edge 411. The slot transmission lines formed between each of impedance matching elements 460, 470 and body edge 411 are thus continued by a hybrid slot transmission line between vertical end portions 465 and 475 up to the full 1.5 meter lengths of impedance matching elements 460 and 470 and are thus half wavelength resonant at the 3 meter center of the commercial FM band.

We claim:

1. A vehicle window antenna for receiving radio waves of a predetermined wavelength in a vehicle having an electrically conducting body forming a window with a window glass disposed therein, the window having a window edge surrounding the window and comprising a horizontal upper edge portion, the antenna comprising an electrically conducting entity affixed to the window glass, the entity comprising, in combination:

a horizontally elongate principal element substantially parallel to and spaced from the upper edge portion of the window and having an effective horizontal length of an odd multiple of one quarter of the predetermined wavelength;

a connecting element connected to the principal element and having a horizontal connecting portion spaced below the principal element by an amount sufficient that no significant slot transmission line is formed therewith; and an impedance matching element in the form of a ribbon having one end connected to the connecting element and extending along but spaced from the window edge so as to electrically couple with the window edge to form a slot transmission line therewith, the impedance matching element having a length of an integer multiple of one half the predetermined wavelength, the slot transmission line being parasitically coupled to the principal element by the connecting element.

2. The antenna of claim 1 wherein the window glass is provided with an upper dark tinted region and the principal element and horizontal connecting portion of the connecting element are disposed within the upper dark tinted region.

3. The antenna of claim 1 wherein the connecting element extends toward each side of the window from the bottom of the principal element and the impedance matching element extends from both ends of the connecting element around the bottom of the window.

4. The antenna of claim 3 wherein the impedance matching element has an effective length of substantially the predetermined wavelength.

5. The antenna of claim 1 wherein the connecting element extends toward one side of the window from the bottom of the principal element and the impedance matching element extends downward from the connecting element near the one side of the window.

6. The antenna of claim 5 wherein the impedance matching element has an effective length of substantially half the predetermined wavelength.

7. The antenna of claim 5 wherein the impedance matching element has an effective length of substantially the predetermined wavelength.

8. The antenna of claim 5 wherein the connecting element extends toward both sides of the window.

9. The antenna of claim 5 wherein:

the antenna further comprises an electrically conducting ground stub affixed to the window glass but not electrically connected with the entity;

the ground stub is electrically coupled to the vehicle body and comprises a ground extension portion directed upward from the window edge at the bottom thereof; and the impedance matching element extends to a point just short of the ground stub and upward from there in a vertical end portion parallel with the ground extension portion and spaced therefrom to continue the slot transmission line therewith.

10. The antenna of claim 1 wherein:

the connecting element extends toward opposite sides of the window from the bottom of the principal element;

the recited impedance matching element comprises a first impedance matching element extending downward from the connecting element at one of the opposite sides of the window, and a second impedance matching element extends downward from the connecting element at another of the opposite sides of the window; and the first and second impedance matching elements have parallel vertical end portions extending upward from the window edge at the bottom thereof and spaced from each other to continue the slot transmission line therebetween.

11. The antenna of claim 10 in which each of the first and second impedance matching elements has an effective length of substantially one half the predetermined wavelength.

* * * * *